US012679717B2

(12) United States Patent
Jost et al.

(10) Patent No.: US 12,679,717 B2
(45) Date of Patent: Jul. 14, 2026

(54) METHOD FOR EVALUATING 3D DATA REPRESENTING A 3D SHAPE, AUXILIARY DEVICE OBTAINED USING SUCH 3D DATA, AND METHOD FOR OBTAINING SUCH 3D DATA

(71) Applicant: TEC Competence UG (haftungsbeschränkt) & Co. KG, Koblenz (DE)

(72) Inventors: Barbara Maria Jost, Koblenz (DE); Michael Rieser, Koblenz (DE)

(73) Assignee: TEC Competence UG (haftungsbeschr änkt) & Co. KG, Koblenz (DE)

( * ) Notice: Subject to any disclaimer, the term of this patent is extended or adjusted under 35 U.S.C. 154(b) by 191 days.

(21) Appl. No.: 18/274,783

(22) PCT Filed: Jan. 29, 2021

(86) PCT No.: PCT/EP2021/052179
§ 371 (c)(1),
(2) Date: Jul. 28, 2023

(87) PCT Pub. No.: WO2022/161625
PCT Pub. Date: Aug. 4, 2022

(65) Prior Publication Data
US 2024/0101409 A1     Mar. 28, 2024

(51) Int. Cl.
*B68C 1/12*        (2006.01)
*A01K 29/00*     (2006.01)
*G06T 7/55*        (2017.01)

(52) U.S. Cl.
CPC .............. *B68C 1/12* (2013.01); *A01K 29/005* (2013.01); *G06T 7/55* (2017.01); *G06T 2200/04* (2013.01);
(Continued)

(58) Field of Classification Search
CPC ........... B68C 1/12; A01K 29/005; G06T 7/55; G06T 7/68; G06T 7/0002; G06T 2200/04;
(Continued)

(56) References Cited

U.S. PATENT DOCUMENTS 4,982,438 A  *  1/1991  Usami .................. H04N 13/243
                                                           382/154
6,674,431 B1 *  1/2004  Enomoto .................. G06T 7/30
                                                           345/958
(Continued)

OTHER PUBLICATIONS

International Search Report filed PCT/EP2021/052179 mailed Oct. 21, 2021.
(Continued)

*Primary Examiner* — Sang H Nguyen
(74) *Attorney, Agent, or Firm* — RANKIN, HILL & CLARK LLP

(57) ABSTRACT
A method is disclosed for evaluating data representing the three-dimensional shape of at least a portion of the surface of a human being or animal, in the following referred to as 3D data, wherein 3D data of at least two data sets, each representing the three-dimensional shape of at least a portion of the surface of a human being or animal and each taken from a database of three-dimensional shapes, in the following referred to as 3D data sets. Auxiliary devices may be manufactured based on 3D data stored in the data base, and a method for obtaining the 3D data to be stored in the data base is also disclosed.

9 Claims, 5 Drawing Sheets

(52) U.S. Cl.
    CPC ............... *G06T 2207/10016* (2013.01); *G06T*
                *2207/10028* (2013.01); *G06T 2207/30204*
                                        (2013.01)

(58) Field of Classification Search
    CPC . G06T 2207/10016; G06T 2207/10028; G06T
                    2207/30204; G06T 2207/30168
    See application file for complete search history.

(56)                    References Cited

U.S. PATENT DOCUMENTS

| | | | |
|---|---|---|---|
| 2002/0024517 A1* | 2/2002 | Yamaguchi .......... | H04N 13/243 |
| | | | 348/E13.071 |
| 2002/0080135 A1* | 6/2002 | Sakakibara ............. | G06T 7/593 |
| | | | 345/419 |
| 2005/0089217 A1* | 4/2005 | Nakagawa .............. | G06T 17/10 |
| | | | 382/162 |
| 2014/0300907 A1 | 10/2014 | Kimmel | |
| 2018/0132726 A1* | 5/2018 | Dickie ................. | H04N 5/2226 |
| 2018/0342108 A1* | 11/2018 | Takahashi ............... | G06T 19/20 |
| 2021/0049826 A1* | 2/2021 | Takahashi ............... | G06T 19/20 |

OTHER PUBLICATIONS

Schwarz Kai: "Den Pferderucken abbilden", Equitrends, Nov. 2013,
XP055:849902, ISSN: 0948-6119.

* cited by examiner

24

| 1 | 2 | 3 | 4 | 5 | 6 | 7 | 8 | 9 |
|---|---|---|---|---|---|---|---|---|
| data set ID | horse ID | date/time | 3D data 1 | saddle info | adjustment info | quality info | 3D data 2 | 3D data 3 |
| ID 1 | H 1 | 2018-10-20 | DS 1 | Man1/Mod1/S1 | Info 1 | good | --- | --- |
| ID 2 | H 1 | 2019-11-03 | DS 2 | Man1/Mod1/S1 | Info 1 | good | --- | --- |
| ID 3 | H 1 | 2020-10-12 | DS 3 | Man1/Mod1/S1 | Info 1 | good | --- | --- |
| ID 4 | H 2 | 2018-08-02 | DS 4 | Man2/Mod2/S2 | Info 2 | good | --- | --- |
| ID 5 | H 2 | 2019-07-31 | DS 5 | Man2/Mod2/S2 | Info 2 | good | --- | --- |
| ID 6 | H 2 | 2020-07-15 | DS 6 | Man2/Mod2/S2 | Info 2 | good | --- | --- |
| ID 7 | H 3 | 2020-12-12 | DS 7 | Man3/Mod3/S3 | Info 3 | good | --- | --- |

METHOD FOR EVALUATING 3D DATA REPRESENTING A 3D SHAPE, AUXILIARY DEVICE OBTAINED USING SUCH 3D DATA, AND METHOD FOR OBTAINING SUCH 3D DATA

According to a first aspect, the invention relates to a method for evaluating data representing the three-dimensional shape of at least a portion of the surface of a human being or animal (in the following briefly referred to as "3D data").

Already here it should be pointed out that it is merely for the sake of simplicity that the invention will be discussed in the following mainly referring to the detection of the three-dimensional shape of the saddle area of the horse's back. In no way, however, this is intended to limit the scope of protection, and those skilled in the art will understand that the invention may be applied to the evaluation of the three-dimensional shape of other surfaces as well. Some other examples may include the shape of the head of a horse, the shape of a hoof of a horse, the shape of a person, in particular the person's legs, sitting in a saddle of a horse, the shape of a foot of a human being, the shape of the back or the front of a human being and the like shapes.

According to one known evaluation method presently used by company TEC Competence, Koblenz, Germany under the trade name "Horseshape", the 3D data of the saddle area of a horse's back is evaluated in order to manufacture two fitting devices, namely a three-dimensional positive fitting device to be used by a saddler in order to adapt a saddle to a specific horse, and a three-dimensional negative fitting device to be used by the horse's owner in order to regularly check whether the horse's saddle area has changed. This known evaluation method, however, merely uses 3D data of one single point of time.

It is therefore the object of the invention to allow a more diverse evaluation.

According to the present invention, this object is solved by a method of the afore-mentioned type wherein 3D data of at least two data sets, each representing the three-dimensional shape of at least a portion of the surface of a human being or animal and each taken from a database of three-dimensional shapes, in the following referred to as 3D data sets, are evaluated.

Taking at least two data sets into account when evaluating the 3D data allows to draw conclusions from the comparison of the data sets and thus massively expands the evaluation possibilities.

According to a first embodiment, the at least two 3D data sets may be 3D is data sets obtained for the same human being or animal at different points of time.

Accordingly, for example, a saddle area diary may be established little by little tracking the development of the shape of the horse's saddle area, e.g. as a result of enhanced training and/or aging. This allows an early detection of disadvantageous developments and thus to adjust the training of the horse.

According to a further example, the progress of a deformation of a human foot (flat foot, splayfoot, . . . ) may be logged.

According to a still further example, intentional movement of the human being or animal may be taken into account, in particular intentional movement to at least two extreme postures, e.g. in order to characterize the human being's or animal's mobility. For each of the postures a 3D data set may be determined.

According to a further embodiment, the at least two 3D data sets may be 3D data sets obtained for different human beings or animals, thus allowing to compare the development histories of a plurality of human beings or animals.

For example, based on the development history of the present horse and the development histories previously obtained for other horses, in particular horses having a sufficiently similarly shaped saddle area, a prognosis may be obtained for the further development of the saddle area of the present horse, e.g. using artificial intelligence.

In order to further enhance the evaluation possibilities, at least some of the 3D data sets of the data base, preferably all 3D data sets, may include additional information related to the 3D data.

For example, the additional information may include information about a device adapted and configured to fit to the surface represented by the 3D data.

The additional information may, for example, include information on the type of saddle (e.g. manufacturer, model, size) which was found to fit to the horse's saddle area. In addition, information on the adaptation measures (e.g. degree of deformation of the gullet plate, location and/or degree of padding the panels) taken by the saddler in order to customize the selected type of saddle to the specific horse may be included in the data set. Using this type of additional information, the evaluation may provide a recommendation which type of saddle might fit best to the presently considered horse. Furthermore, the degree of fit and/or whether a used saddle of the recommended type is available may be indicated.

In the case of a human being's foot, the additional information may, for example, include information on the type of shoe (e.g. manufacturer, model, size) which was found to fit to the foot. Using this type of additional information, the evaluation may provide a recommendation which type of shoe might fit to the presently considered foot.

Furthermore, the additional information may, for example, include additional 3D data representing the saddle sitting in the horse's saddle area. On the basis this type of additional information, the evaluation may even provide a visualization of the recommended saddle's fit to the horse's saddle area, using the 3D data of the present horse's saddle area, the 3D data of the other horse's saddle area, and the 3D data of the other horse's saddle area including the saddle, as an adaptation of the padding of the panels in predetermined limits is always possible. This visualization may be provided on a screen either showing the 3D data of the saddle area of the present horse together with the 3D data of the other horse's saddle or using augmented reality techniques showing the 3D data of the other horse's saddle fit to a real image of the present horse's saddle area.

Finally, the additional information may, for example, include information on the type of training and/or the health history (e.g. lameness, and if yes, position and/or duration, and the like) during the time period since the preceding 3D data acquisition. Using this type of additional information, the evaluation may provide a recommendation for a future training counteracting any detrimental development.

According to a further embodiment, 3D data of at least two 3D data sets are used for manufacturing an auxiliary device, e.g. a compensation pad.

As such auxiliary devices e.g. compensation pads are known. Such compensation pads, for example, are usually used for at least reducing deviations between the actual three-dimensional shape of the surface, e.g. the horse's back, and a desired target shape of the surface. Compensation pads known in the art usually are manufactured from a gel having a generally constant thickness and yielding in those portions of the saddle area in which a higher pressure is exerted by the saddle.

In contrast to that, according to the invention two 3D data sets may be used for manufacturing said auxiliary device, e.g. compensation pad, namely two data sets obtained for the same portion of the surface of the human being or animal at two different points of time.

For example, the use of two data sets of the horse's saddle area, according to the present invention, in particular a first data set representing the three-dimensional shape of the horse's saddle area at the point of time when the saddle was fit to the horse and a second data set representing the present three-dimensional shape of the horse's saddle area, allows to determine the differences between the two shapes and to manufacture a customized compensation pad balancing these differences. Such a compensation pad may enhance the horse's situation until the manufacturing of its new saddle is finished.

According to a further embodiment, two 3D data sets may be used for manufacturing said auxiliary device, e.g. compensation pad, namely two data sets obtained for the same portion of the surface of two different human beings or animals.

For example, in the case of the purchase of a used saddle, the two data sets used may include a first data set representing the three-dimensional shape of the present horse's saddle area and a second data set representing either the present three-dimensional shape of the saddle area of the other horse previously wearing the saddle or three-dimensional shape of the saddle area of the other horse obtained at the time the saddle was adjusted to the other horse.

According to a still further embodiment, at least three 3D data sets may be used for manufacturing auxiliary device, e.g. said compensation pad, namely a first 3D data set obtained for the portion of the surface of the human being or animal, and at least two 3D data sets obtained for the portion of the surface of another human being or animal at different points of time.

Referring to at least some of the additional information provided by the database, it might also be conceivable to extrapolate the development of a young horse's back and to manufacture at least one compensation pad at least decreasing, if not fully eliminating any differences between the young horse's saddle area and the saddle which was manufactured already for the grown up horse's saddle area.

It goes without saying that the same extrapolations may also be done for aged horses progressively developing a swayback.

The compensation pad may be manufactured either directly, for example using 3D printing techniques of flexible materials or stacking of pieces of sheet material appropriately cut, e.g. laser cut, to size in correspondence with the deviations between the actual three-dimensional shape and the desired target shape of the surface. As an alternative, the manufacturing of the compensation pad may include milling its 3D shape from a material of constant thickness. As a further alternative, the manufacturing of the compensation pad may include the intermediate step of providing a mould for casting the compensation pad, e.g. by using 3D printing techniques or milling.

In view of the above, independent protection is also requested for the compensation pad manufactured using the afore-discussed method.

Furthermore, independent protection is sought compensation pad manufactured based on an evaluation of an asymmetry between the left half and the right half of the three-dimensional shape, e.g. of the horse's saddle area.

In the extrapolation case, the three-dimensional positive fitting device required by a saddler and/or the three-dimensional negative fitting device to be used by the horse's owner in order to regularly check whether the horse's saddle area has changed as forecast mentioned at the outset have to be manufactured based on the extrapolated data set.

As such fitting devices as well constitute auxiliary devices according to the present invention, independent protection is also sought for said positive fitting device and/or said negative fitting device.

According to a further aspect, the invention relates to a fitting device including a three-dimensional positive model of the three-dimensional shape of at least a portion of the surface of a human being or animal on its upper side and a three-dimensional negative model of said three-dimensional shape on its lower side.

As compared to the fitting devices discussed at the outset, the fitting device according to the present invention is advantageous in view of the considerably reduced consumption of material required for providing both models, the positive model and the negative model.

Moreover, the match of the positive model and the negative model is increased as both models are formed on one and the same fitting device. This is in particular true for fitting devices including at least two longitudinal elements and a plurality of transverse elements interlocked with each other in log-cabin style. If two separate fitting devices have to be provided, it is difficult to guarantee the precisely match the interlockings of both fitting devices.

According to the present invention, the fitting device may be made from sheet material, in particular a light-weight sheet material, e.g. the sheet material distributed under the trade name KAPA Plast®. This sheet material is available in thicknesses of 5 mm and 10 mm, may be printed, e.g. for indicating a code identifying the fitting device, a part number or other reference information, and may be cut, e.g. using a laser cutting machine. As an alternative, the fitting device may be made from wire, in particular metal wire, e.g. bent by a CNC bending machine, and connection pieces, e.g. made from plastics material. As a further alternative, the fitting device may be made using 3D-printing techniques.

At this point it is worth to emphasize that the results all afore-mentioned types of evaluations could either be presented in an app executed in the user's smartphone and/or on a local computer having a corresponding database and software installed thereon and/or on a server accessed via the internet. If the results are presented on the user's smartphone or the server is accessed using the user's smartphone, they may further be presented in the form of augmented reality, e.g. by highlighting the locations of asymmetries between the left and right sides of the horse, e.g. by using different colors indication the amount of asymmetry, or by highlighting areas in which the saddle area of the horse's back changed due to training, e.g. by using different colors indication the amount of change, or by adding a three-dimensional representation of a proposed saddle to the image of the horse's back.

It should be noted that the afore-discussed aspects of the present invention were independent from the way the three-dimensional data was obtained, and there are several methods known for obtaining such three-dimensional data.

For example, Apple Inc. uses since the introduction of the iPhone® X a method for enabling the user of the cell phone to log in or identify himself to his cell phone by means of his face. This option is offered by Apple Inc. under the trade name "Face ID". The optical recording device has the trade name "True Depth camera".

To log in to the cell phone, the user holds the cell phone in front of his face. A dot projector projects a grid of more than 30,000 infrared dots onto the user's face, and an infrared camera records the pattern. By comparing the known shape of the pattern with the image of the user's face captured by the infrared camera, an evaluation unit of the optical recording device can generate a three-dimensional image (in the following briefly "3D image") of the face that can be compared with a 3D image of the face of the user of the cell phone stored in the cell phone. The "Face ID" method takes advantage of the fact that the areas of the face relevant for identifying the user are predominantly facing the cell phone.

A further method is used by company Tec Competence, Koblenz, Germany under the trade name "Horseshape". In this method, a scanner is held above the horse's back between the horse's withers and croup for a predetermined time while the scanner creates a 3D image of the horse's back. However, the accuracy of the scan result depends on the angle that a tangent to the horse's body includes with rays that connect the respective surface portion of the horse's body to the optics of the scanner. However, the areas of the horse's body relevant to the fit of a saddle clearly extend into the laterally sloping sections of the horse's back.

Finally, it is also known to determine the three-dimensional shape of surfaces by comparing a plurality of two-dimensional images (in the following briefly "2D image"), for example a plurality of frames of a video recording of the respective surface. Even though the camera can be moved around the surface while recording the video, the quality of the result often leaves much to be desired, because the information contained in the images often does not allow the images to be overlapped to each other correctly with the required precision. Furthermore, the results are highly dependent on stable lighting conditions and/or a proper camera calibration (lens distortion) and/or the stationarity of the human being or animal.

All these methods have their disadvantages in view of the precision of the determination of the 3D data.

According to a further aspect, the present invention, therefore, relates to a method for detecting the three-dimensional shape of a surface using an optical recording device which is adapted and configured for taking images containing three-dimensional data of the surface, in the following referred to as "3D images", the optical recording device is moved along the surface while taking a plurality of 3D images, an inertial measurement unit (IMU) detects the movement and orientation of the optical recording device in three-dimensional space, the temporal correlation of the data acquired by the IMU with the three-dimensional data provided by the optical recording device is taken into account when determining the three-dimensional shape of the surface, and providing detection data representing the determined three-dimensional shape of the surface.

The essential advantage of the method according to the invention is not only that instead of 2D images a plurality of 3D images are used, i.e. images which, in contrast to purely 2D images, also contain the information about the position of the respective image points in the depth dimension, but above all in the fact that in order to determine the way in which the individual images are to be overlapped in order to form the three-dimensional shape of the entire surface, not only the optical data of the images are used, but in addition the data acquired by the IMU are used.

According to a further embodiment, the method may further include applying position markers onto the surface, before moving the optical recording device along the surface.

In particular, if the position markers are applied to characteristic reference positions of the surface, e.g. immediately behind the shoulder blades of a horse, the detection of these position markers may facilitate to determine the three-dimensional shape of the surface.

It goes without saying that two-dimensional position markers as well as three-dimensional position markers may be used.

Although the position of the surface relative to its surroundings may be detected based on the 3D images taken by the optical recording device, the detection accuracy may be increased if a position sensor allocated to the optical recording device detects the position of the optical recording device relative to the surroundings.

For example, the position sensor may include a LIDAR sensor unit. Furthermore, the position sensor may be directed to a characteristic surface of a room, e.g. the ceiling of the room, in which the surface to be detected is located, which allows to increase the accuracy of the detection of the position and orientation of the optical recording device in the three-dimensional space.

According to a further embodiment, the method may further include improving the 3D images before determining the three-dimensional shape of the surface. For example, the 3D images may be denoised, e.g. by applying statistical outlier removal, moving least squares techniques and the like, and/or smoothened, e.g. by using an Gaussian filter, and/or downsampled and/or upsampled.

According to a further embodiment, the method may further include determining the quality of the 3D images before determining the three-dimensional shape of the surface.

In particular, the 3D images may be checked based on the basis of at least one of the following criteria, namely whether the lighting conditions were appropriate (for example, if the stability of the white balancing is exceeding a predetermined threshold value, the lighting conditions may be deemed appropriate), whether the 3D image shows the surface of interest, whether the distance to the surface of interest is appropriate (for example, if the distance is greater than a predetermined lower threshold value, but lower than a predetermined higher threshold value, the distance may be deemed appropriate), whether the movement velocity of the optical recording device was appropriate (for example, if the movement velocity of the optical recording device stays below a predetermined threshold value, the movement velocity may be deemed appropriate), whether the stationarity of the surface is appropriate (for example, if the movement of the human being or animal including the surface stayed below a predetermined threshold value, the stationarity may be deemed appropriate), whether motion blur is present (even if the movement velocity and the stationarity both were found to be appropriate, the combination of both effects may result in motion blur).

According to a further embodiment, the method may further include using only 3D images having a quality exceeding a predetermined quality threshold value for determining the three-dimensional shape of the surface.

According to a further embodiment, the method may further include determining the quality of the detection data representing the three-dimensional shape of the surface. For example, the value of the quality of the detection data representing the three-dimensional shape of the surface may be determined as the average value of the 3D images used for determining the detection data.

Furthermore, the method may include to inform the user of the quality of the detection data, optionally including information about the result relating to the individual quality criteria.

According to a further embodiment, the method may further include combining 3D images of at least two scans of the surface carried out using the optical recording device at different points of time and/or carried out by two independent optical recording devices at the same point of time and/or different points of time.

According to a further embodiment, the method may further include determining characteristic properties of the surface.

In the case of detecting the three-dimensional shape of a horse's back, such characteristic properties may include at least one of the following properties:

The orientation of the surface relative to the three-dimensional space surrounding it.

For example, it is important to know whether the hindquarters of the horse are longer or shorter than its forehand, in order to determine whether the horse has a downhill or uphill position, and in order to allow the saddler to compensate this position by appropriately constructing the saddle such that the rider may sit in a substantially upright position on his/her horse.

Relevant positions.

For example, the shoulder blade position and/or the location of the spine and/or the girthing position are, important for the saddler in order to properly locate and dimension the panels, the gullet and the girth straps.

Furthermore, the position of the rear end of the withers may be used as the origin of a three-dimensional coordinate system in which the three-dimensional shape is oriented, the z-axis representing the vertical direction, the x-axis substantially corresponding to the extension of the horse's spine, and the y-axis representing the transverse direction.

If markers were applied to the surface indicating the relevant positions, these markers may be detected in the 3D images, e.g. based on their color, their shape or the like. In addition or as an alternative, the three-dimensional surface may be analyzed based on internal application specific models and algorithms, e.g. referring to assumptions based on typical shapes, utilizing traditional algorithms and/or artificial intelligence.

Furthermore, the content of the 3D image may be divided into a plurality of sections (clusters), each representing an individual sub-content, e.g. the proper back of the horse, the surrounding floor, and the like. In addition, it is possible to eliminate regions of low interest from a section of interest, e.g. the croup portion and/or neck portion of the horse, i.e. portions not belonging to the proper saddle area. This can be done by known techniques, e.g. octree based cluster extraction and specific segmentation.

Meta data describing the three-dimensional surface.

In the case of a horse's back, these meta data may, for example, include:

Information specifying the shape of the withers, e.g. short/long, low/high, lean/bony/thick, pronounced/poorly defined, and the like.

Location and amount of left/right asymmetries, e.g. caused by muscle atrophy.

In the case of a foot, these meta data may, for example, include:

Length, width, height of the instep and shoe size of the foot.

Malpositions, e.g. hallux valgus.

According to a further embodiment, the method may further include using a smartphone having the optical recording device and the inertial movement unit (IMU), and preferably the position sensor, integrated therein.

In the following, embodiments of the present invention will be discussed in more detail referring to the accompanying drawings in which FIG. 1 shows a schematic plan view of an acquisition process of a horse's back;

FIG. 3 represents an example of a data base displayed as a chart;

Figure 1:
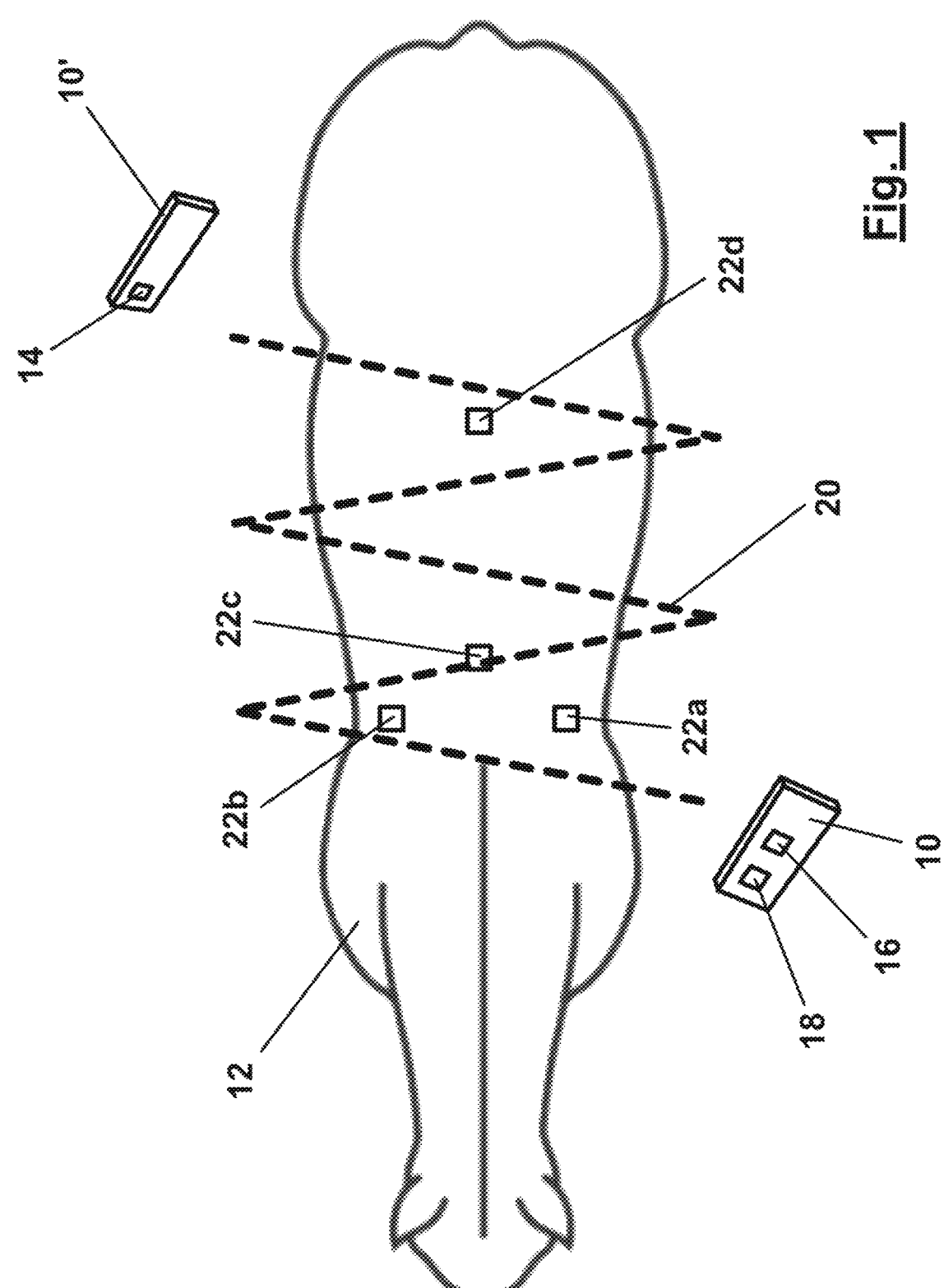

According to the present invention, a method is provided in which the three-dimensional shape of a surface is detected using an optical recording device. In FIG. 1, a smartphone 10 is used as the optical recording device to detect the structure of a back of a horse 12. The smartphone 10 comprises a 3D camera 14 that is adapted to record 3D images, e.g. a camera distributed by Apple Inc. in all types of iPhone® starting from iPhone® X under the trade name "True Depth camera". The smartphone 10 further comprises an inertial measurement unit (IMU) 16 that is adapted to detect the movement and orientation of the smartphone 10 in three-dimensional space, and a LIDAR unit 18 that is adapted to emit light and detect scattered light.

The smartphone 10 is moved along a path 20 over the horse's back while taking a plurality of 3D images using the 3D camera 14 at its front side. Reference numeral 10 refers to the smartphone in its starting position and reference numeral 10' to the smartphone in its end position.

It shall be noted that the smartphone 10 is not merely moved in a zig-zag-pattern but is rotated while moving along the path from one side of the horse 12 to the other. Preferably, the smartphone 10 is rotated is a way such that the 3D camera 14 is facing towards the horse 12. Furthermore, portions of the path 20 that are arranged more laterally with respect to the horse 12 may be lower than portions of the path 20 that are arranged more medially with respect to the horse 12. Thus, a substantially constant distance from the smartphone 10 to the horse 12 may be achieved.

While moving the smartphone 10, a temporal correlation of the data acquired by the IMU 16 with the three-dimensional data provided by the 3D camera 14 is recorded and later taken into account when determining the three-dimensional shape of the surface.

According to FIG. 1, the LIDAR unit 18 is located at the back side of the smartphone 10, i.e. at its side facing away from the horse 12. Accordingly, the LIDAR unit 18 records images of the room in which the horse 12 is located, e.g. images of the walls and/or the ceiling of the room. As these walls and/or images are immobile they may later serve as reference points for determining the horses absolute position and orientation in the room.

Additionally, it can be seen in FIG. 1 that markers 22*a* to 22*d* may attached to the horse 12. These markers 22*a* to 22*d* are applied to characteristic reference positions of the back of the horse 12. Markers 22*a* and 22*b* are located immediately behind the shoulder blades of the horse 12, while markers 22*c* and 22*d* are located in the middle of the back of the horse 12, one, marker 22*c*, at the front end and the other, marker 22*d*, at the rear end of the horse's saddle area 12*a*. After the acquisition of the 3D data, the markers 22*a* to 22*d* may be detected in the 3D images, e.g. based on their color, their shape or the like.

Figure 2:
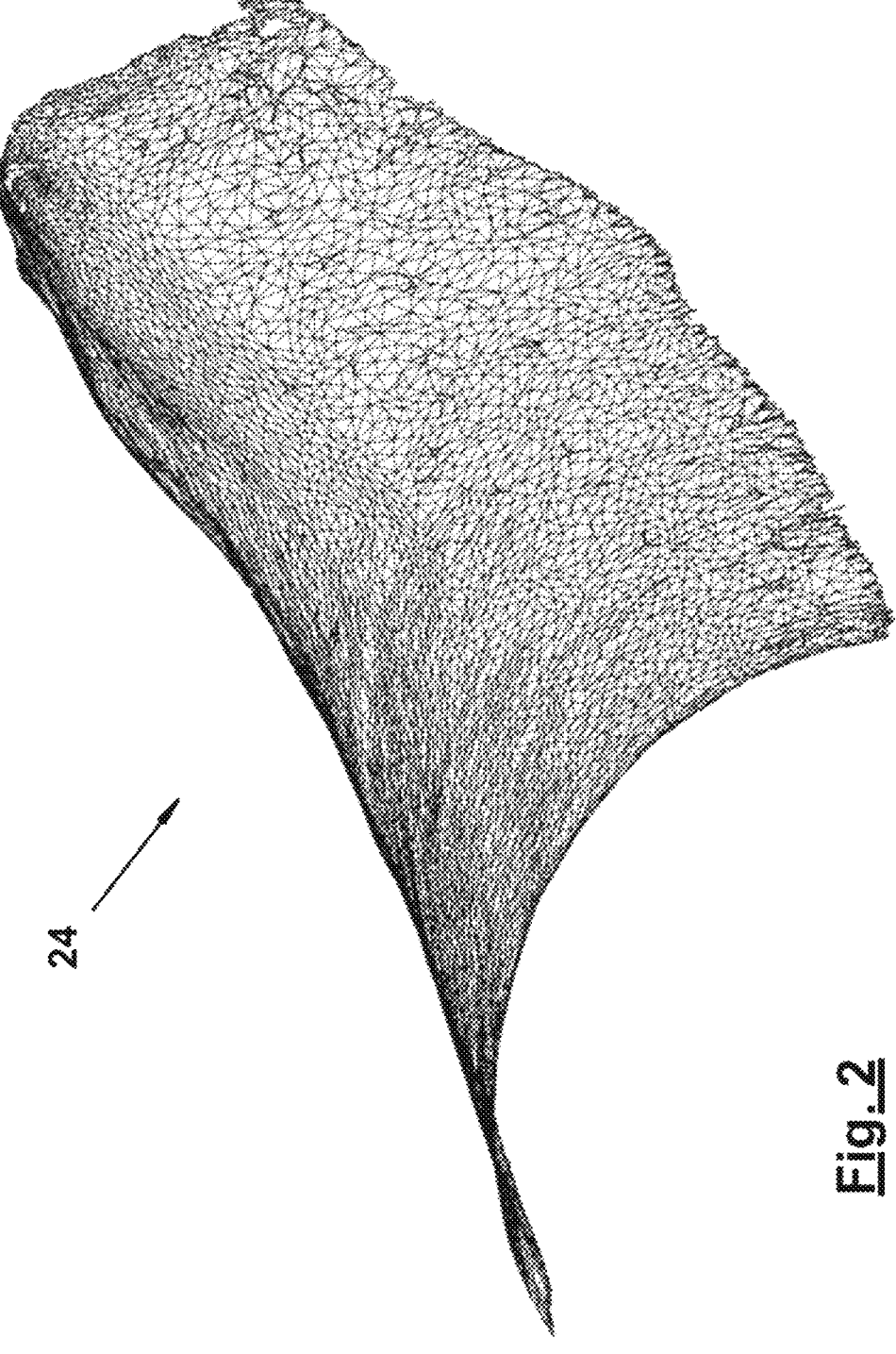
FIG. 2 shows the result of the data acquisition according to FIG. 1 as a 3D model.

FIG. 2 shows an example of a 3D representation 24 of accordingly generated 3D data of the back of the horse 12.

According to the present invention, the 3D data are stored in a database 50 (see FIG. 3). In column 1 of each data set 52 a data set ID is indicated. In column 2 a horse's name is given. In column 3 date and time may be entered, in particular a date and time of the acquisition of the respective data set. In column 4 first 3D data are provided, for example 3D data acquired of the bare back of the horse 12, i.e. without any saddle or other covering, e.g. the 3d data 24 shown in FIG. 2. In column 5 additional information with respect to a saddle, e.g. manufacturer, model, size, may be given. In column 6 additional information with respect to adjustments of the horse's equipment may be given, such as information regarding the place and amount of padding, information regarding a deformation of a gullet plate etc. In column 7 information may be provided indicating the quality of the first 3D data of column 4. And in columns 8 and 9 second and third 3D data may be provided that are generated while a saddle is attached to the horse 12, but without a rider sitting on the horse 12, and while a rider is sitting on the horse 12.

As may be seen from FIG. 3, data sets for a plurality of horses and points of time may be collected in the data base 50.

It should be emphasized that the data base 50 is not limited to 3D data obtained using the data acquisition method described referring to FIG. 1. 3D data acquired using other methods, e.g. the afore-described method applied by company Tec Competence, Koblenz, Germany under the trade name "Horseshape", may be stored in the data base 50 as well.

Based on the data collected in the data base 50, a plurality of evaluations may be carried out.

For example, the owner of a horse may refer to the data sets 52 of his/her horse as a saddle area diary, in order to see whether the horse's training shows the desired results or in order to detect detrimental developments at an early point of time.

Furthermore, the data sets 52 may be used for obtaining information which type of saddle (manufacturer, model, size, . . . ) may fit best to a specific horse, by evaluating the data base for horses having a sufficiently similar shape of the saddle area. Additionally, the database 50 may provide the information whether or not a fitting used saddle is available.

Figure 4:
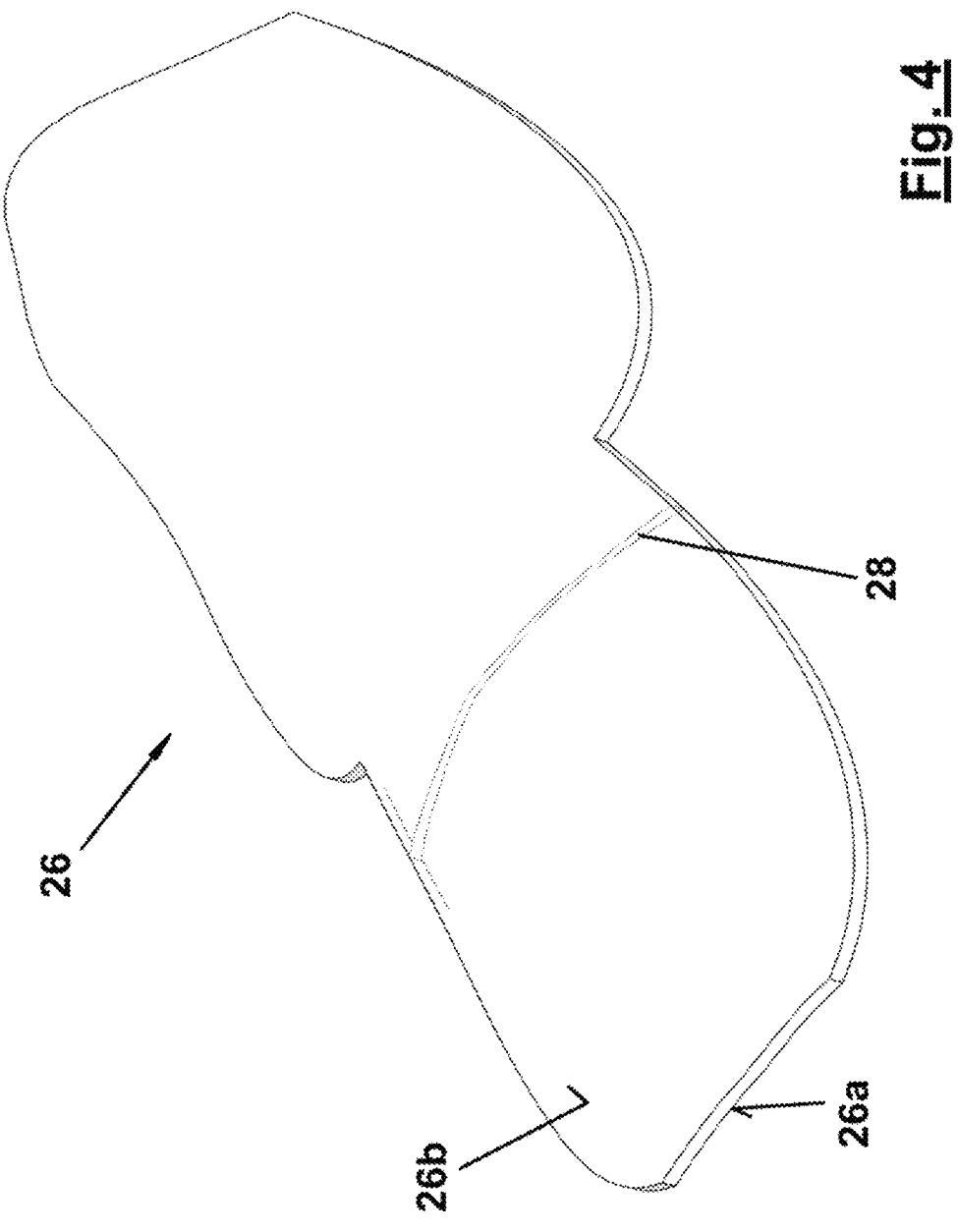
FIG. 4 shows a schematic view of an example of a compensation pad.
Figure 5:
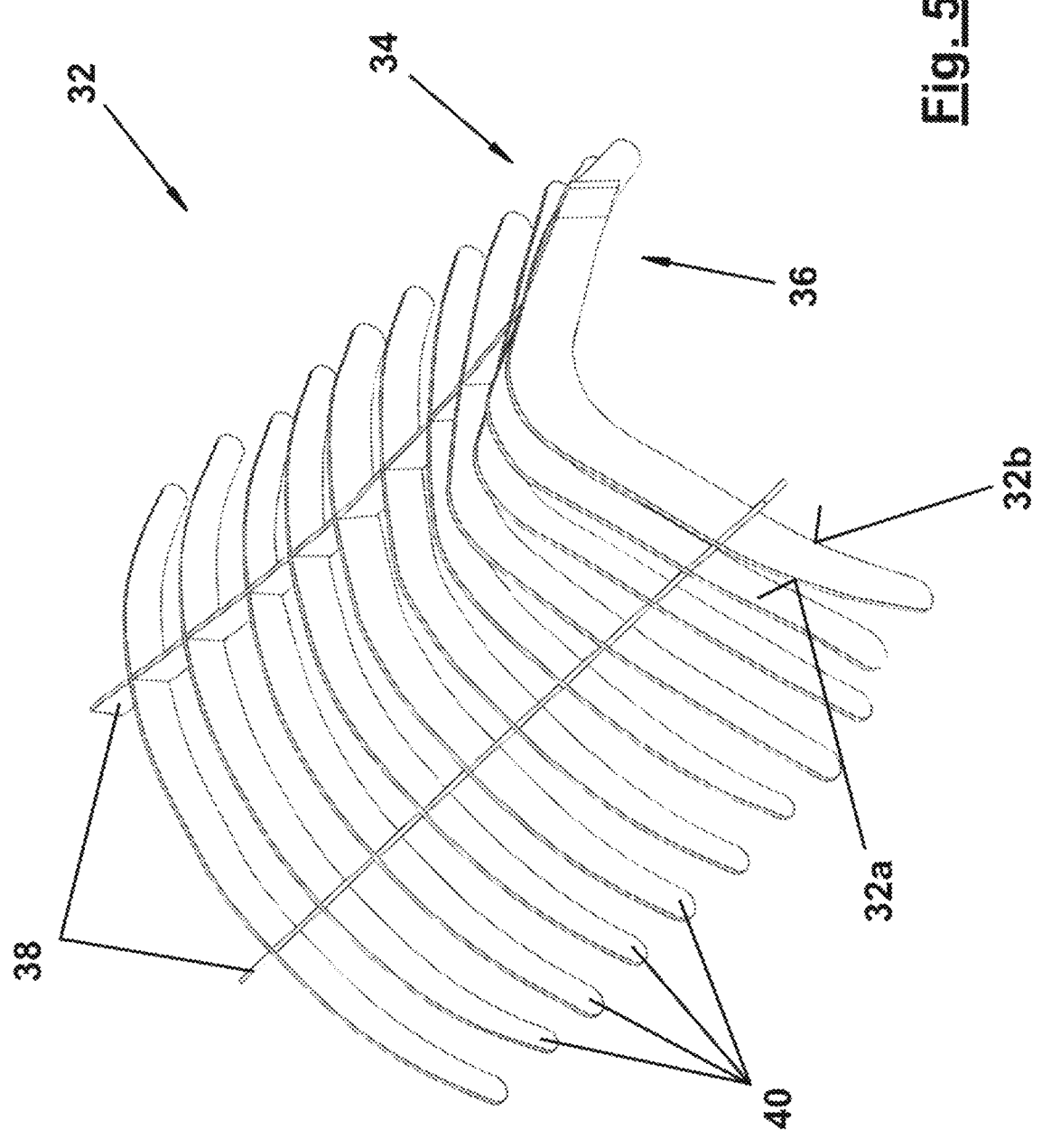
FIG. 5 shows a perspective view of an example of a fitting set.

As those skilled in the art will easily understand that all evaluation methods discussed in the introductory part of the specification may be carried out based on the data base 50 shown in FIG. 3, the further discussion will be restricted for the sake of conciseness to the manufacturing of two types of auxiliary devices, namely a compensation pad 26 shown in FIG. 4 and a fitting device 32 shown in FIG. 5.

If the comparison of the 3D data of two 3D data sets 52 of the same horse 12 obtained at two different points of time reveal a considerable development of the horse's back, a customized compensation pad 26 may be manufactured based on the two data sets 52 in order to at least reduce deviations between the previous and the actual three-dimensional shapes of the horse's back.

An example of such a customized compensation pad 26 is shown in FIG. 4. The compensation pad 26 has an inner surface 26*a* fitting to the actual shape of the horse's back and an outer surface 26*b* simulating the previous shape of the horse's back, thus matching the lower surface of a saddle (not shown) the compensation pad 26 is customized for. Cross-section 28 shows the variation of the thickness of the compensation pad 26.

Of course, one of other above-mentioned applications is to use the compensation pad 26 for compensating left-and-right-asymmetries of the saddle area of the horse 12.

FIG. 5 shows an example of a fitting device 32 manufactured based on 3D data stored in or obtained using the data base 50. In particular, the fitting device 32 includes a three-dimensional positive model 34 of the horse's back on its upper side 32*a* and a three-dimensional negative model 36 of the horse's back on its lower side 32*b*. The positive model 34 can be used by a saddler for adjusting the saddle to the hose's back, and the negative model 36 may be used by the horse's owner in order to regularly check whether the horse's saddle area has changed to an extent requiring maintenance of the saddle.

The fitting device 32 includes two longitudinal elements 38 and a plurality (eleven in the example shown in FIG. 5) of transverse elements 40 interlocked with each other by the two longitudinal elements 38 in a log-cabin style. In other words, the upper and lower edges of the elements 38, 40 define the positive and negative models 34, 36 of the fitting device 32.

All of the longitudinal elements 38 and/or the transverse elements 40 may be manufactured from a sheet material, such as KAPA Plast®, e.g. having a thickness from 5 mm to 10 mm.

The invention claimed is:

1. A method for evaluating data representing the three-dimensional shape of at least a portion of a surface of a human being or animal, in the following referred to as three-dimensional (3D) data, the method comprising:

obtaining three-dimensional (3D) data of at least two 3D data sets using an optical recording device that is adapted and configured for taking images containing three-dimensional data of the surface, wherein the optical recording device includes a 3D camera that is adapted to record 3D images and an inertial measurement unit that is adapted to detect movement and orientation of the optical recording device in three-dimensional space;

moving the optical recording device along the surface while taking a plurality of 3D images;

detecting the movement and orientation of the optical recording device in the three-dimensional space with the inertial measurement unit;

determining a three-dimensional shape of the surface by taking into account a temporal correlation of the data acquired by the inertial measurement unit with the 3D data provided by the optical recording device; and providing detection data representing the determined three-dimensional shape of the surface, wherein the 3D data of the at least two 3D data sets, each representing the three-dimensional shape of at least a portion of the surface of a human being or animal and each taken from a database of three-dimensional shapes, are evaluated, wherein the at least two 3D data sets are 3D data sets obtained for different human beings or animals to compare the three-dimensional shapes of the different human beings or animals.

2. The method of any of claim 1, wherein at least some of the 3D data sets of the database include additional information related to the 3D data.

3. The method of claim 2, wherein the additional information includes information about a device adapted and configured to fit to a surface represented by the 3D data.

4. The method of claim 1, wherein 3D data of at least two 3D data sets are used for manufacturing an auxiliary device.

5. The method of claim 4, wherein two 3D data sets are used for manufacturing said auxiliary device, namely two 3D data sets obtained for the same portion of the surface of two different human beings or animals.

6. The method of claim 4, wherein at least three data sets are used for manufacturing said auxiliary device, namely a first data set obtained for the portion of the surface of the human being or animal, and at least two data sets obtained for the portion of the surface of another human being or animal at different points of time.

7. A compensation pad manufactured using the method of claim 4.

8. A positive fitting device and/or a negative fitting device manufactured using the method of claim 4.

9. A fitting device including a three-dimensional positive model of the three-dimensional shape of at least a portion of the surface of a human being or animal on its upper side and a three-dimensional negative model of said three-dimensional shape on its lower side manufactured according to claim 4.

* * * * *